United States Patent
Guo et al.

(10) Patent No.: US 10,929,179 B2
(45) Date of Patent: Feb. 23, 2021

(54) SCHEDULING METHOD AND ELECTRONIC DEVICE

(71) Applicant: Huawei Technologies Co., Ltd., Shenzhen (CN)

(72) Inventors: Jiachun Guo, Beijing (CN); Qingqing Li, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 115 days.

(21) Appl. No.: 16/139,817

(22) Filed: Sep. 24, 2018

(65) Prior Publication Data

US 2019/0034229 A1 Jan. 31, 2019

Related U.S. Application Data

(63) Continuation of application No. PCT/CN2017/076962, filed on Mar. 16, 2017.

(30) Foreign Application Priority Data

Mar. 24, 2016 (CN) .......................... 201610176197.3

(51) Int. Cl.
  *G06F 1/00* (2006.01)
  *G06F 9/48* (2006.01)
  (Continued)

(52) U.S. Cl.
  CPC ........ *G06F 9/4881* (2013.01); *G06F 9/30189* (2013.01); *G06F 9/5038* (2013.01);
  (Continued)

(58) Field of Classification Search
  CPC .................................................. G06F 9/4881
  See application file for complete search history.

(56) References Cited

U.S. PATENT DOCUMENTS 7,743,268 B2 * 6/2010 Hinosugi ............... H04B 10/40
                                                          713/320
8,213,864 B1 7/2012 Zhodzishsky et al.
(Continued)

FOREIGN PATENT DOCUMENTS

CN       1924761 A    3/2007
CN     103124274 A    5/2013
(Continued)

OTHER PUBLICATIONS

Machine Translation and Abstract of Chinese Publication No. CN1924761, Mar. 7, 2007, 41 pages.
(Continued)

*Primary Examiner* — Mohammed H Rehman
(74) *Attorney, Agent, or Firm* — Conley Rose, P.C.

(57) ABSTRACT

An electronic device monitors a volume of data processed by the electronic device within a first monitoring time segment, where a processor of the electronic device is configured to be in a first working mode, and the processor processes data in a poll mode driver (PMD) manner in the first working mode. The electronic device switches the processor from the first working mode to a second working mode when it is determined, according to the volume of data processed by the electronic device within the first monitoring time segment, that the processor is idle within the first monitoring time segment, where the processor processes data in the PMD manner and a sleep manner in the second working mode.

20 Claims, 10 Drawing Sheets

(51) Int. Cl.
*G06F 11/30* (2006.01)
*G06F 11/34* (2006.01)
*G06F 9/30* (2018.01)
*G06F 9/50* (2006.01)

(52) U.S. Cl.
CPC .......... *G06F 11/30* (2013.01); *G06F 11/3024* (2013.01); *G06F 11/3423* (2013.01); *G06F 11/3428* (2013.01); *G06F 11/3433* (2013.01); *Y02D 10/00* (2018.01)

(56) References Cited

U.S. PATENT DOCUMENTS

| | | | |
|---|---|---|---|
| 2006/0288349 A1 | 12/2006 | Zimmer et al. | |
| 2008/0154503 A1* | 6/2008 | Wittenber | A61B 5/02055 701/300 |
| 2012/0052807 A1* | 3/2012 | Rathi | H04W 76/15 455/41.3 |
| 2013/0031392 A1 | 1/2013 | McLane | |
| 2015/0319599 A1* | 11/2015 | Seok | H04W 48/16 370/338 |
| 2016/0165540 A1 | 6/2016 | Kokovidis et al. | |
| 2017/0134325 A1* | 5/2017 | Apfelbaum | H04L 47/70 |
| 2019/0056972 A1* | 2/2019 | Zhou | G06F 11/3476 |

FOREIGN PATENT DOCUMENTS

| | | |
|---|---|---|
| CN | 103731364 A | 4/2014 |
| CN | 103891361 A | 6/2014 |
| CN | 103906462 A | 7/2014 |
| CN | 104469905 A | 3/2015 |
| CN | 105786674 A | 7/2016 |
| EP | 3238403 A1 | 11/2017 |
| WO | 2016101099 A1 | 6/2016 |

OTHER PUBLICATIONS

Machine Translation and Abstract of Chinese Publication No. CN103124274, May 29, 2013, 14 pages.
Machine Translation and Abstract of Chinese Publication No. CN103731364, Apr. 16, 2014, 12 pages.
Machine Translation and Abstract of Chinese Publication No. CN104469905, Mar. 25, 2015, 14 pages.
Machine Translation and Abstract of Chinese Publication No. CN105786674, Jul. 20, 2016, 37 pages.
Lin, S., et al., "Research and Implementation of a Power Controlling Strategy Based on CPU Utilization," Computer Engineering and Science, vol. 31, No. A1, 2009, 4 pages.
English Translation of Lin, S., et al., "Research and Implementation of a Power Controlling Strategy Based on CPU Utilization," Computer Engineering and Science, vol. 31, No. A1, 2009, 8 pages.
Foreign Communication From a Counterpart Application, PCT Application No. PCT/CN2017/076962, English Translation of International Search Report dated Jun. 22, 2017, 2 pages.
Foreign Communication From a Counterpart Application, PCT Application No. PCT/CN2017/076962, English Translation of Written Opinion Search Report dated Jun. 22, 2017, 7 pages.
"Intel Data Plane Development Kit (Intel DPDK), Sample Applications User Guide," XP055556292, Jun. 30, 2014, pp. 1-162.
"Sample Applications User Guide, Release 2.0.0," XP055556591, Apr. 24, 2015, pp. 1-193.
Foreign Communication From a Counterpart Application, European Application No. 17769373.6, Extended European Search Report dated Feb. 25, 2019, 11 pages.

* cited by examiner

SCHEDULING METHOD AND ELECTRONIC DEVICE

CROSS-REFERENCE TO RELATED APPLICATIONS

This application is a continuation of International Patent Application No. PCT/CN2017/076962 filed on Mar. 16, 2017, which claims priority to Chinese Patent Application No. 201610176197.3 filed on Mar. 24, 2016. The disclosures of the aforementioned applications are hereby incorporated by reference in their entireties.

TECHNICAL FIELD

The application relates to the field of communications technologies, and in particular, to a scheduling method and an electronic device.

BACKGROUND

Networks of network operators are filled with a large quantity of dedicated hardware devices of different types, and a quantity of types is continuously increasing. Releasing of a new network device often requires introduction of a new hardware type, and it is increasingly difficult to find space and power supply suitable for such hardware. Network functions virtualization (NFV) aims to consolidate network device types onto industry-standard high-volume servers, switches, and storage devices using a standard information technology (IT) virtualization technology. The NFV is applicable to data plane (DP) packet processing and control plane (CP) functions in a fixed network infrastructure and a mobile network infrastructure. Currently, the NFV technology is rapidly developing.

A virtualized network function (VNF) is a module that runs in an NFV architecture and that performs a particular network function, and may include functions such as routing, exchanging, serving, and cloud computing. The VNF may be a module that runs in a virtual machine (VM) and that performs a particular network function.

In the NFV technology, usually, a host operating system (OS) runs on a physical host, and a guest OS runs on a VM. One physical host may include one or more VMs. The physical host is a hardware device and belongs to an electronic device. The VM is a device obtained after software virtualization. A VM that includes a network interface card is used as an example. A device that processes data using a poll mode driver (PMD) uses a PMD loop to receive a data packet, process the data packet, and send the data packet. To receive the data packet in a timely manner, the loop execution process is performed in a form of an infinite loop after the VM starts. Consequently, a processor is always in a busy state, and energy consumption is relatively high.

SUMMARY

Embodiments of the application provide a scheduling method and an electronic device in order to reduce energy consumption.

According to a first aspect, an embodiment of the application provides a scheduling method that is applied to an electronic device, and the method includes monitoring a volume of data processed by the electronic device within a first monitoring time segment, where a processor of the electronic device is configured to be in a first working mode, and the processor processes data in a PMD manner in the first working mode, and switching the processor from the first working mode to a second working mode if it is determined, according to the volume of data processed by the electronic device within the first monitoring time segment, that the processor is idle within the first monitoring time segment, where the processor processes data in the PMD manner and a sleep manner in the second working mode.

The processor processing data in the PMD manner and a sleep manner may be as follows. The processor alternately uses the PMD manner and the sleep manner to process data. The processor processes data in two manners, the PMD manner and the sleep manner. The processor alternately uses the two data processing manners.

In this embodiment, data processing may be data packet receiving, data packet sending, or other data processing. Specific content of data processing is not uniquely limited in this embodiment of the application. Based on different types of data processing content, a volume of processed data is measured in different manners. For example, the data packet receiving may be determined using a quantity of received data packets.

There is a relatively large quantity of manners of determining, using a volume of data processed by the processor within a time segment, whether the processor is idle within the time segment. Data packet receiving and/or sending is used as an example. The manner may be if it is determined, by means of monitoring, that data traffic of the electronic device within the first monitoring time segment is less than or equal to a first threshold, it is determined that the processor is idle within the first monitoring time segment, where the first threshold is a threshold corresponding to the data traffic that is a volume of data received in a unit time. Alternatively, the manner may be if it is determined, by means of monitoring, that the volume of data processed by the electronic device within the first monitoring time segment is less than or equal to a first threshold, it is determined that the processor is idle within the first monitoring time segment, where the first threshold is a threshold corresponding to the volume of data processed within the first monitoring time segment. The first threshold is a threshold used to determine whether the processor is relatively idle. When the processor is relatively idle, the processor is switched to a working mode with relatively low energy consumption.

In an optional implementation, the processor uses the second working mode within a first basic time slice, and that the processor processes data in the PMD manner and a sleep manner in the second working mode includes that the first basic time slice includes a first time segment and a second time segment, and the processor sleeps within the first time segment, and works within the second time segment.

In this embodiment, the first basic time slice and a second basic time slice in a subsequent embodiment are obtained after basic time slices are classified. The first basic time slice may be a first basic time slice that exists after the processor is switched from the first working mode to the second working mode. Alternatively, in the second working mode, the processor works, by default in each basic time slice, in a working mode within the first basic time slice. The second working mode may be a representative of another basic time slice other than the first basic time slice. In this case, the first basic time slice may be considered as a previous basic time slice of the second basic time slice. Duration of a basic time slice may be randomly set, and usually may be set to be relatively short. The first time segment and the second time segment may be correspondingly relatively short. In this way, scheduling precision can be improved. In addition, the processor sleeps for a relatively short time each time such that a response speed of the processor can be improved.

In an optional implementation, a specific implementation solution for increasing working state control flexibility is further provided, and is further as follows. After the first basic time slice for the processor ends, the method further includes determining, by the processor, a busy/idle state of the processor within the first basic time slice, and working, by the processor, within a first time segment of the second basic time slice when the busy/idle state of the processor within the first basic time slice is a busy state.

In this embodiment, whether the processor works within the first time segment depends on a current busy/idle state of the processor. A data processing capability of the processor may be dynamically adjusted on the premise that a working mode of the processor is not switched such that the data processing capability of the processor can match an actual requirement to improve a speed of responding to a data processing requirement, energy consumption is in a linear positive correlation with actual data traffic, and working mode switching of the processor due to a sudden change in instantaneous data traffic can be avoided.

In an optional implementation, if the processor completes data processing before the second time segment of the first basic time slice ends, that the processor works within the second time segment includes ending, by the processor, the second time segment of the first basic time slice in advance, or sleeping in a remaining time of the second time segment.

In this embodiment, the processor may not always need to process data within the second time segment, and therefore no data may need to be processed by the processor for a relatively long time within the second time segment. By means of this embodiment, the sleep time may be further increased based on an actual data processing requirement to further reduce power consumption of the processor.

In an optional implementation, determining, by the processor, a busy/idle state of the processor within the first basic time slice includes determining, by the electronic device, that the busy/idle state within the first basic time slice is a busy state if a time in which the processor processes data within the first basic time slice is greater than a first threshold, determining, by the electronic device, that the busy/idle state within the first basic time slice is a busy state if the processor is in a data processing state when the second time segment of the first basic time slice ends, or determining, by the electronic device, that the busy/idle state within the first basic time slice is a busy state if a volume of data processed by the processor within the first basic time slice is greater than a second threshold.

In this embodiment, both the first threshold and the second threshold are thresholds used to determine whether the processor is busy within the first basic time slice. A time consumed to process data is used as a reference for the first threshold, and a longer time consumed to process data indicates that the processor is busier. A volume of data is used as a reference for the second threshold, and a larger volume of data indicates that the processor is busier. A value that is further used is not uniquely limited in this embodiment of the application.

In an optional implementation, the method further includes determining, by the electronic device, that the busy/idle state within the first basic time slice is an idle state if a time in which the processor processes data within the first basic time slice is less than a third threshold, where the third threshold is less than or equal to the first threshold, determining, by the electronic device, that the busy/idle state within the first basic time slice is an idle state if the processor is in a sleep state when the second time segment of the first basic time slice ends, or if the processor ends the second time segment of the first basic time slice in advance, or determining, by the electronic device, that the busy/idle state within the first basic time slice is an idle state if a volume of data processed by the processor within the first basic time slice is less than a fourth threshold, where the fourth threshold is less than or equal to the second threshold.

In this embodiment, both the third threshold and the fourth threshold are thresholds used to determine whether the processor is busy within the first basic time slice. A time consumed to process data is used as a reference for the third threshold, and a longer time consumed to process data indicates that the processor is busier. A volume of data is used as a reference for the fourth threshold, and a larger volume of data indicates that the processor is busier. A value that is used is not uniquely limited in this embodiment of the application.

In an optional implementation, the method further includes monitoring a volume of data processed by the electronic device within a second monitoring time segment when the processor is in the second working mode, and switching the processor from the second working mode to the first working mode if it is determined, according to the volume of data processed by the electronic device within the second monitoring time segment, that the processor is busy within the second monitoring time segment, where the first threshold is greater than or equal to the second threshold.

Data traffic is still used as an example. The data traffic is used as a criterion for measuring whether the processor is idle. This embodiment may further include when the processor is in the second working mode, data traffic of the electronic device within the second monitoring time segment is monitored, and the processor is switched from the second working mode to the first working mode if it is determined, by means of monitoring, that the data traffic of the electronic device within the second monitoring time segment is greater than or equal to the second threshold, where the first threshold is greater than or equal to the second threshold.

In this embodiment, when the second threshold is used to determine that the processor is relatively busy or a relatively large quantity of data packets currently need to be processed, an application scenario in which the processor exerts a maximum data processing capability of the processor to a greatest extent is needed. That the second threshold is greater than the first threshold may be used as an implementation solution. When a volume of actually processed data is between the first threshold and the second threshold, a current working mode may be maintained such that when the volume of actually processed data changes around the first threshold and the second threshold, the processor is prevented from being frequently switched between the first working mode and the second working mode.

According to a second aspect, an embodiment of the application further provides an electronic device, including a data volume detection unit configured to monitor a volume of data processed by the electronic device within a first monitoring time segment, a switching control unit configured to switch a processing unit from the first working mode to a second working mode if it is determined, according to the volume of data processed by the electronic device within the first monitoring time segment, that the processing unit is idle within the first monitoring time segment, and the processing unit configured to process, by the processing unit, data in a PMD manner in the first working mode when the processing unit is configured to be in the first working mode, and process, by the processing unit, data in the PMD manner and a sleep manner in the second working mode.

In an optional implementation, the processing unit is further configured to use the second working mode within a first basic time slice in the second working mode, where the first basic time slice includes a first time segment and a second time segment, and the processing unit sleeps within the first time segment, and works within the second time segment.

In an optional implementation, the processing unit further includes a busy/idle determining unit configured to determine a busy/idle state of the processing unit within the first basic time slice after the first basic time slice ends, and a working control unit configured to control the processing unit to work within a first time segment of a second basic time slice when the busy/idle determining unit determines that the busy/idle state of the processing unit within the first basic time slice is a busy state.

In an optional implementation, if the processing unit completes data processing before the second time segment of the first basic time slice ends, the processing unit is further configured to end the second time segment of the first basic time slice in advance, or sleep in a remaining time of the second time segment.

In an optional implementation, the busy/idle determining unit is further configured to determine, by the electronic device, that the busy/idle state within the first basic time slice is a busy state if a time in which the processing unit processes data within the first basic time slice is greater than a first threshold, determine, by the electronic device, that the busy/idle state within the first basic time slice is a busy state if the processing unit is in a data processing state when the second time segment of the first basic time slice ends, or determine, by the electronic device, that the busy/idle state within the first basic time slice is a busy state if a volume of data processed by the processing unit within the first basic time slice is greater than a second threshold.

In an optional implementation, the busy/idle determining unit is further configured to determine that the busy/idle state within the first basic time slice is an idle state if a time in which the processing unit processes data within the first basic time slice is less than the third threshold, where the third threshold is less than or equal to the first threshold, determine that the busy/idle state within the first basic time slice is an idle state if the processing unit is in a sleep state when the second time segment of the first basic time slice ends, or if the processing unit ends the second time segment of the first basic time slice in advance, or determine that the busy/idle state within the first basic time slice is an idle state if a volume of data processed by the processing unit within the first basic time slice is less than a fourth threshold, where the fourth threshold is less than or equal to the second threshold.

In an optional implementation, the data volume detection unit is further configured to monitor a volume of data processed by the electronic device within a second monitoring time segment when the processing unit is in the second working mode, and the switching control unit is further configured to switch the processing unit from the second working mode to the first working mode if it is determined, according to the volume of data processed by the electronic device within the second monitoring time segment, that the processing unit is busy within the second monitoring time segment.

Data traffic is still used as an example. The data traffic is used as a criterion for measuring whether the processing unit is idle. This embodiment may further include that the switching control unit is further configured to switch the processing unit from the second working mode to the first working mode if it is determined, by means of monitoring, that data traffic of the electronic device within the second monitoring time segment is greater than or equal to the second threshold, where the first threshold is greater than or equal to the second threshold.

According to a third aspect, an embodiment of the application further provides another electronic device, including a processor, a communications module, and a memory, where the memory may provide a cache required by the processor for processing data.

The processor may perform the steps in the method embodiment to implement corresponding functions of the electronic device. A specific implementation procedure of the steps in the method embodiment may be stored in the memory in a form of software, and the processor executes the software to implement the steps in the method embodiment. Details are not described in this embodiment again.

It can be learned from the foregoing technical solutions that the embodiments of the application have the following advantages. For the electronic device that works in the PMD manner, the two working modes are provided for the processor of the electronic device. Power consumption is relatively high in the first working mode, and power consumption is relatively low in the second working mode. The volume of data processed by the processor is monitored such that when a relatively small volume of data is actually processed, energy consumption can be reduced using a working mode with relatively low energy consumption.

BRIEF DESCRIPTION OF DRAWINGS

To describe the technical solutions in some of the embodiments of the application more clearly, the following briefly describes the accompanying drawings describing some of the embodiments. The accompanying drawings in the following description show merely some embodiments of the application, and a person of ordinary skill in the art may still derive other drawings from these accompanying drawings without creative efforts.

DESCRIPTION OF EMBODIMENTS

To make the objectives, technical solutions, and advantages of the application clearer, the following further describes the application in detail with reference to the accompanying drawings. The described embodiments are merely some but not all of the embodiments of the application. All other embodiments obtained by a person of ordinary skill in the art based on the embodiments of the application without creative efforts shall fall within the protection scope of the application.

Figure 1:
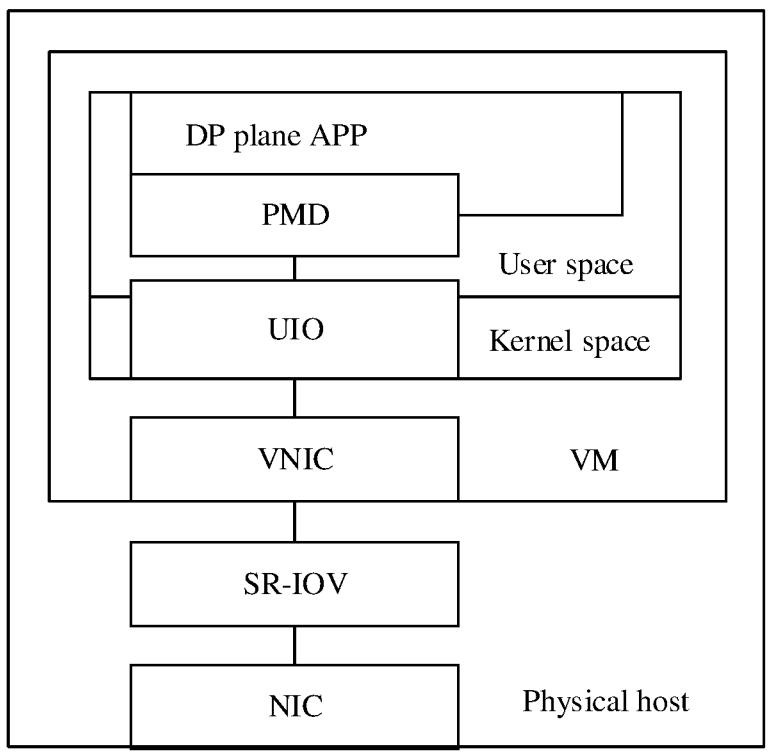
FIG. 1 is a schematic structural diagram of a system according to an embodiment of the application.

As shown in FIG. 1, FIG. 1 shows an example of a system structure according to an embodiment of the application. A physical host may use LINUX as an OS. A VM that runs on the physical host may replace dedicated hardware. Like a real hardware device, the VM has a DP, a control plane CP, and a virtual network interface controller (VNIC), that is, a virtual network interface card. The DP and the CP are concepts in layering of protocols. One type is a user data layer, and the other type is a control layer. The DP relates to processing and transmission of user data. Corresponding to the structure shown in FIG. 1, the CP relates to monitoring and control of a PMD in the VM. For a specific structure, refer to FIG. 2.

The virtual network interface card cannot directly perform data communication with a network device other than the physical host like a network interface controller (NIC), that is, a physical network interface card. Therefore, there is a virtual data channel between the physical network interface card and the virtual network interface card. Then, the virtual network interface card performs data communication with a network device other than the physical host using the physical network interface card. The data channel may be obtained using a hardware virtualization technology such as single-root input/output (I/O) virtualization (SR-IOV). An application (also referred to as APP) that runs in the VM needs to receive a data packet, and receives data packets in batches using a PMD.

The system structure shown in FIG. 1 mainly includes two parts, the physical host that runs a host OS and the VM that runs a guest OS. The physical host includes a physical network interface card NIC and SR-IOV. Alternatively, the SR-IOV may be on a VM side. The VM includes an APP, a PMD, and a LINUX user space I/O driver that are on the DP, Userspace I/O (UIO), and a VNIC. The APP and the PMD on the DP belong to user space, and the UIO belongs to kernel space.

Based on the system architecture shown in FIG. 1, an example that the APP sends a data packet is used. Data packet sending in a PMD mode is as follows. The PMD uses an infinite loop to attempt to receive a data packet from the APP, process the received data packet, and send the processed data packet. The data packet sent by the PMD is sent to the VNIC, and then is sent by the VNIC to the NIC using the SR-IOV. The NIC sends the data packet to a network device other than the physical host.

To reduce data packet copies in a process of sending a data packet from the APP to the NIC, a shared-memory manner may be used, and is further as follows. The APP stores, into a shared memory, a data packet that needs to be sent, and then information about an address of the data packet in the shared memory, such as a pointer to a storage address of the data packet in the shared memory, is transmitted from the PMD to the NIC. In the system architecture shown in FIG. 1, a data packet is transparently transmitted between the physical host and the VM, with a relatively few times of OS scheduling. By means of a shared-memory mechanism, the data packet does not need to be copied during transmission from the physical network interface card to the user-mode APP. Based on isolation of the user-mode DP, NFV scalability is relatively good. In addition, the user-mode APP receives a data packet without requiring a system to call a kernel. In addition, the PMD mode also has some advantages. For example, the PMD mode substantially has no power consumption and procedure control, and therefore is easy to implement. Based on the foregoing description, it can be learned that during PMD infinite loop execution, a data packet may be equivalently replaced with information about an address of the data packet in a shared memory.

During the infinite loop execution, if no data packet is to be sent by the APP, or a relatively small data volume of data packets is to be sent by the APP, the following case occurs. No data packet is received during execution of some loops, or a volume of data received during execution of one loop is less than a maximum volume of data that can be processed in the loop, that is, there are a few data packets in a unit time, that is, data traffic is relatively small. In this case, if a processor still executes the infinite loop to maintain 100% utilization, power consumption of the processor always keeps at a fixed relatively high level, and the power consumption is greatly wasted. The utilization of the processor is 100%, but a few data packets are actually received. Therefore, power consumption is high but efficiency is low.

To resolve power consumption waste caused by execution of the infinite loop by the processor to maintain the 100% utilization, this embodiment of the application provides a more refined power consumption management solution in order to reduce the power consumption of the processor using the CP when the APP receives a relatively small quantity of data packets (that is, when data traffic is relatively small). In this embodiment of the application, a manner of reducing the power consumption of the processor may include reducing a primary frequency of the processor, or enabling the processor to be in a non-working state at some times. The primary frequency of the processor may be reduced by means of configuring the primary frequency of the processor, reducing a voltage of the processor, or the like. A specific manner is determined according to a primary frequency reduction implementation supported by the processor. Enabling the processor to be in a non-working state at certain times may include enabling the processor to intermittently sleep or intermittently stop execution of the infinite loop. For a sleep implementation solution, there may be different sleep choices in different application scenarios. For example, in an application scenario of a single-core processor, the entire processor may sleep. In an application scenario in which a processor has multiple cores or many cores, all of the cores of the processor may sleep, or some of the cores of the processor may sleep. The power consumption of the processor is reduced mainly in the latter manner in this embodiment of the application.

Figure 2:
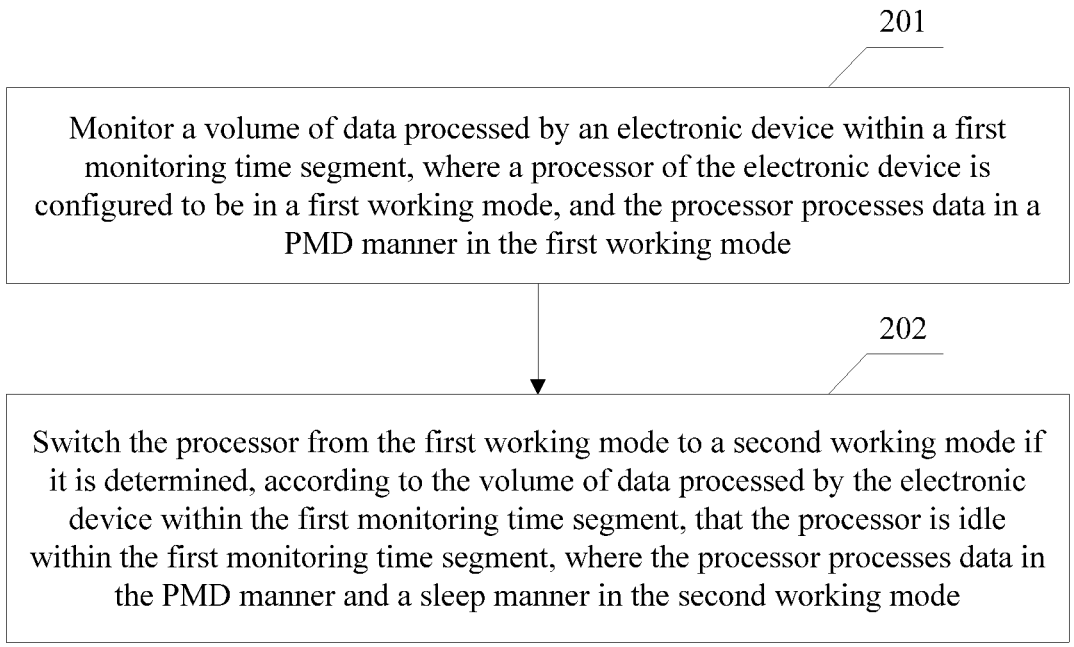
FIG. 2 is a schematic flowchart of a method according to an embodiment of the application.

Based on the application scenario examples described in the foregoing embodiment, an embodiment of the application provides a scheduling method that is applied to an electronic device. As shown in FIG. 2, the method further includes the following steps.

In this embodiment of the application, for a processor, higher power consumption of the processor indicates a larger volume of data that can be processed in a unit time. Power consumption is relatively high in a first working mode, and power consumption is relatively low in a second working mode. In this embodiment, classification of working modes of the processor may not be limited to two working modes. The "first working mode" and the "second working mode" that are used in this embodiment of the application are merely intended for distinguishing between the two working modes of the processor, and it should not be understood that the working modes can be classified into only two working modes.

In this embodiment, "processing data in a PMD manner" is a technical means of using a poll manner to drive an electronic device to process data. A feature of the technical means is executing an infinite loop to attempt to receive a data packet or query whether there is data that needs to be processed. Consequently, the processor is always in a state of running at full load.

A technical solution in this embodiment of the application may be applied to a VM and a hardware entity device. Therefore, the processor in this embodiment of the application should not be limited only to a physical processor of the electronic device, but should be further extended to a data processing resource allocated to a VM. Corresponding to the VM, theoretically, in the second working mode, data processing resources allocated to the VM may be reduced, or the VM may occupy fewer allocated data processing resources.

Step 201. Monitor a volume of data processed by the electronic device within a first monitoring time segment, where a processor of the electronic device is configured to be in a first working mode, and the processor processes data in a PMD manner in the first working mode.

In this embodiment, the processed data may be a received data packet. Correspondingly, the volume of data may be measured using a quantity of received data packets. After the volume of data processed by the electronic device is determined by means of monitoring, data traffic may be obtained by means of calculation using the volume of data. In this case, this step may be monitoring the data traffic received by the electronic device, where the processor of the electronic device is configured to be in the first working mode, and the processor receives a data packet in the PMD manner in the first working mode.

The data traffic is a volume of data actually received in a unit time. The volume of data may be measured using data of data packets, and therefore herein may be a ratio of a quantity of data packets received within the first monitoring time segment to duration of the first monitoring time segment.

In this embodiment of the application, the terms "first" and "second" are used to distinguish between technical names, and do not represent other technical meanings. For example, the "first working mode" and the "second working mode" represent two different working modes of the processor. Compared with the first working mode, a sleep time is added in the second working mode. A "first threshold" and a "second threshold" represent two different data traffic thresholds, and are used to distinguish between a threshold at which the processor needs to be switched to an energy saving mode and a threshold at which the processor needs to be switched to a performance mode.

Step 202. Switch the processor from the first working mode to a second working mode if it is determined, according to the volume of data processed by the electronic device within the first monitoring time segment, that the processor is idle within the first monitoring time segment, where the processor processes data in the PMD manner and a sleep manner in the second working mode.

Based on the foregoing example in which the data traffic is used, this step may be switching the processor from the first working mode to the second working mode if it is determined, by means of monitoring, that the data traffic of the electronic device within the first monitoring time segment is less than or equal to a first threshold.

In this embodiment, the volume of data processed by the electronic device may be monitored in a periodic monitoring manner. Therefore, the first monitoring time segment may be a periodic monitoring time period, and monitoring periods are equal in time. In addition, if duration of the first monitoring time segment is a fixed value, for example, one time period, this embodiment may be as follows. A quantity of data packets received by the electronic device within the first monitoring time segment is monitored when the processor of the electronic device is in the first working mode, and the processor is switched from the first working mode to the second working mode if it is determined, by means of monitoring, that the quantity of data packets received by the electronic device within the first monitoring time segment is less than or equal to a predetermined threshold. It can be learned that, if the first monitoring time segment is a fixed value, using the volume of data as a measurement criterion and using the data traffic as a measurement criterion have a same technical effect and are equivalent.

The first threshold may be a specified value used to measure a size of data traffic. Different processors differ in a data packet receiving speed, and therefore differ in data traffic that can be borne. The first threshold is a threshold used to determine whether the processor is relatively idle. Therefore, the threshold may be set according to experience. Alternatively, a better specific value of the first threshold may be determined after an actual test is performed based on this embodiment of the application. A specific value is not uniquely limited in this embodiment of the application.

This embodiment of the application may be executed by the electronic device. The electronic device may be the physical host described in the foregoing embodiment, for example, a server or a terminal host, or may be any other electronic device that processes data in the PMD manner. If this embodiment is applied to the field of NFV technologies, and if a VM processes data in the PMD manner, the electronic device may be an electronic device that provides a hardware resource for the VM. A specific representation form of the electronic device is not uniquely limited in this embodiment of the application.

In this embodiment, for the electronic device that processes data using a PMD, the two working modes are provided for the processor of the electronic device. Power consumption is relatively high in the first working mode, and power consumption is relatively low in the second working mode. The volume of data processed by the processor is monitored such that when a relatively small volume of data is actually processed, energy consumption can be reduced using a working mode with relatively low energy consumption.

In the foregoing embodiment, the PMD manner and the sleep manner are alternately used to process data. An alternate manner may be random. Compared with the first working mode, the sleep time is added in the second working mode, and therefore an energy saving effect can be achieved. This embodiment of the application further provides a specific manner of alternately processing data. The specific manner is as follows. The processor uses the second working mode within a first basic time slice. That the processor processes data in the PMD manner and a sleep manner in the second working mode includes the first basic time slice includes a first time segment and a second time segment, and the processor sleeps within the first time segment, and works within the second time segment.

In this embodiment, in terms of a time segment in which the processor is in the second working mode, the time segment may include multiple first basic time segments, and each basic time segment may be relatively long, or may be relatively short. The first basic time slice is divided into the first time segment and the second time segment to control the working modes. In this embodiment, that the processor works means that the processor processes data in the PMD manner. That the processor processes data in the PMD manner does not indicate that data is necessarily processed. Whether data is processed depends on whether there is actually data that needs to be processed. That the processor sleeps means that the processor does not process data, that is, when the processor sleeps, regardless of whether there is data that needs to be processed, the processor does not perform an operation of processing data in the PMD manner.

Based on the implementation solution in which the basic time slice is divided into the first time segment and the second time segment to control the working modes in this embodiment of the application, this embodiment of the application further provides a specific implementation solution for increasing working mode control flexibility. The solution is as follows. After the first basic time slice for the processor ends, the method further includes determining, by the processor, a busy/idle state of the processor within the first basic time slice, and working, by the processor, within a first time segment of a second basic time slice when the busy/idle state of the processor within the first basic time slice is a busy state.

There are two busy/idle states, a busy state and an idle state. The busy state means that a volume of received and processed data is greater than a threshold, and has the following representation forms. The processor is relatively busy, an actual load ratio is relatively high in this case, and data traffic is relatively large. The idle state has the following representation forms. The processor is relatively idle, an actual load ratio is relatively small in this case, and data traffic is relatively small. In this embodiment of the application, received data traffic may be less than another threshold when the processor sleeps or when the processor is in a working state.

In this embodiment, whether the processor works within the first time segment depends on a current busy/idle state of the processor. A data processing capability of the processor is dynamically adjusted on the premise that a working mode of the processor is not switched such that the data processing capability of the processor can match an actual requirement to improve a speed of responding to a data processing requirement, and working mode switching of the processor due to a sudden change in an instantaneous data processing requirement can be avoided.

This embodiment of the application further provides an implementation solution for controlling the working mode of the processor within the second time segment of the basic time slice. The solution is as follows. That the processor works within the second time segment includes ending, by the processor, the second time segment of the first basic time slice in advance, or sleeping in a remaining time of the second time segment if the processor completes data processing before the second time segment of the first basic time slice ends.

The processor may not always need to process data within the second time segment, and therefore no data may need to be processed by the processor for a relatively long time within the second time segment. Therefore, by means of this embodiment, the sleep time may be further increased based on an actual data processing requirement to further reduce power consumption of the processor. By means of the solution in this embodiment, the basic time slice may be set to be relatively short. If a manner of "ending the second time of the first basic time slice in advance" is used, the second time segment may be set to be relatively long, or may be set to be relatively short. If a manner of "sleeping in the remaining time of the second time segment" is used, both the first time segment and the second time segment are set to be relatively short to improve a speed of responding to a data packet receiving requirement.

This embodiment further provides a specific implementation solution for determining the busy/idle state of the processor within the first basic time slice based on a specific application scenario of this embodiment of the application. The solution is as follows. Determining, by the processor, a busy/idle state of the processor within the first basic time slice includes determining, by the electronic device, that the busy/idle state within the first basic time slice is a busy state if a time in which the processor processes data within the first basic time slice is greater than a first threshold, determining, by the electronic device, that the busy/idle state within the first basic time slice is a busy state if the processor is in a data processing state when the second time segment of the first basic time slice ends, or determining, by the electronic device, that the busy/idle state within the first basic time slice is a busy state if a volume of data processed by the processor within the first basic time slice is greater than a second threshold.

In this embodiment, both the first threshold and the second threshold are thresholds used to determine whether the processor is busy within the first basic time slice. A time consumed to process data is used as a reference for the first threshold, and a longer time consumed to process data indicates that the processor is busier. A volume of data is used as a reference for the second threshold, and a larger volume of data indicates that the processor is busier. A value that is used is not uniquely limited in this embodiment of the application.

This embodiment further provides a specific implementation solution for determining the busy/idle state of the processor within the first basic time slice based on a specific application scenario of this embodiment of the application. The solution is as follows. The method further includes determining, by the electronic device, that the busy/idle state within the first basic time slice is an idle state if a time in which the processor processes data within the first basic time slice is less than a third threshold, where the third threshold is less than or equal to the first threshold, determining, by the electronic device, that the busy/idle state within the first basic time slice is an idle state if the processor is in a sleep state when the second time segment of the first basic time slice ends, or if the processor ends the second time segment of the first basic time slice in advance, or determining, by the electronic device, that the busy/idle state within the first basic time slice is an idle state if a volume of data processed by the processor within the first basic time slice is less than a fourth threshold, where the fourth threshold is less than or equal to the second threshold.

In this embodiment, both the third threshold and the fourth threshold are thresholds used to determine whether the processor is busy within the first basic time slice. A time consumed to process data is used as a reference for the third threshold, and a longer time consumed to process data indicates that the processor is busier. A volume of data is used as a reference for the fourth threshold, and a larger volume of data indicates that the processor is busier. A value that is used is not uniquely limited in this embodiment of the application.

Based on the implementation solution that is for switching from the first working mode to the second working mode and that is provided in the foregoing embodiment, this embodiment of the application further provides a specific implementation solution for switching from the second working mode back to the first working mode. The solution is as follows. The method further includes monitoring a volume of data processed by the electronic device within a second monitoring time segment when the processor is in the second working mode, and switching the processor from the second working mode to the first working mode if the volume of data processed by the electronic device within the second monitoring time segment is detected and it is determined, according to the volume of data processed by the electronic device within the second monitoring time segment, that the processor is busy within the second monitoring time segment, where the first threshold is greater than or equal to the second threshold.

Data traffic is still used as an example. The data traffic is used as a criterion for measuring whether the processor is idle. This embodiment may be further When the processor is in the second working mode, data traffic of the electronic device within the second monitoring time segment is monitored, and the processor is switched from the second working mode to the first working mode if it is determined, by means of monitoring, that the data traffic of the electronic device within the second monitoring time segment is greater than or equal to the second threshold, where the first threshold is greater than or equal to the second threshold.

When the second threshold is used to determine that the processor is relatively busy or a relatively large quantity of data packets currently need to be received, an application scenario in which the processor exerts a maximum data packet receiving capability of the processor to a greatest extent is needed. That the second threshold is greater than the first threshold may be used as a preferred implementation solution. When actual data traffic is between the first threshold and the second threshold, a current working mode may be maintained, that is, is not switched. In this way, when the actual data traffic changes around the first threshold and the second threshold, the processor can be prevented from being frequently switched between the first working mode and the second working mode.

In addition, in this embodiment of the application, both the "first monitoring time segment" and the "second monitoring time segment" that is subsequently mentioned are time segment concepts, and both the two monitoring time segments may be time periods. Different periods may be used for the two monitoring time segments. Therefore, the first monitoring time segment and the second monitoring time segment may be different or may be the same. This is not uniquely limited in this embodiment of the application. A shorter monitoring time segment leads to more sensitive switching and a faster response speed. A longer monitoring time segment may lead to reduction in switching frequency.

In a more specific application example, the solution in this embodiment of the application may be applied to a virtual device. In the virtual device, there is a relatively large quantity of requirements for receiving a data packet using a PMD. For example, software uses an infinite-loop manner to attempt to receive/send a data packet. In this case, the electronic device is the virtual device, and the data processing is data packet receiving and/or data packet sending.

An embodiment describes more details about a second working mode using an example. For example, data processing is data packet receiving. Data traffic is used as a reference for measuring whether a processor is busy. The data traffic is a quantity of data packets received in a unit time. In the second working mode, a first monitoring time segment is defined as a time window, each time window includes multiple basic time slices, and each basic time slice includes a first time segment for sleeping and a second time segment for attempting to perform scheduling. For details, refer to subsequent detailed description. This embodiment of the application may include the following three parts.

Part 1: By default, a first working mode is used to receive a data packet on a DP to maintain high data packet receiving performance of a VM.

A volume of data actually processed on the DP within a timing period is monitored, and a busy/idle state of the DP within the customized period is marked. If it is detected, by means of monitoring, that all states of the DP within N consecutive timing periods are idle states, a packet receiving model of the DP is switched to the second working mode. Otherwise, the DP is still in the first working mode. N may be randomly set. A larger N leads to a smaller quantity of switching times. A smaller N leads to more refined energy consumption control. A relatively balanced N may be determined after an actual test is performed. In this embodiment, because a time of the timing period is fixed, a data processing capability of the processor within a timing period, that is, maximum data traffic that the processor can bear, is fixed. Within a timing period, larger data traffic that actually occurs indicates that the processor is busier, and smaller data traffic that actually occurs indicates that the processor is idler. Because the maximum data traffic that the processor can bear is fixed within the timing period, data traffic that actually occurs within the timing period may be equivalent to a quantity of data packets actually processed within the period, for example, a quantity of received data packets or a quantity of sent data packets.

Figure 3:
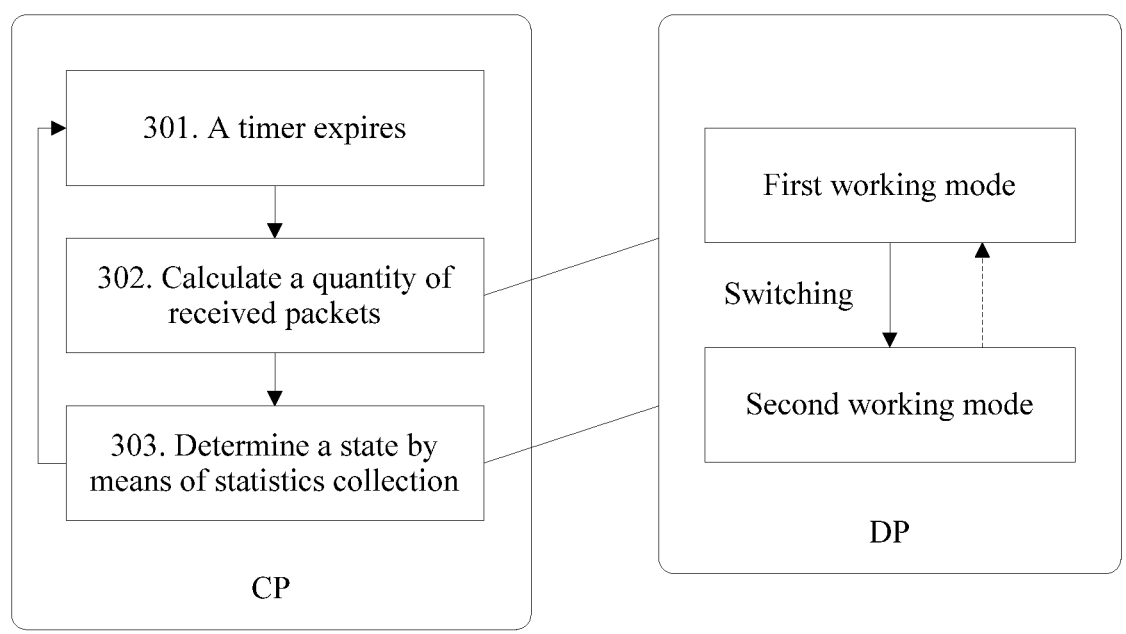
FIG. 3 is a schematic structural diagram of a system according to an embodiment of the application.

A specific procedure is shown in FIG. 3, and includes the following steps.

Step 301. A CP starts a timer, and when the timer expires, restarts the timer and performs step 302.

Step 302. Calculate a quantity of packets actually received on the DP within a timing period in which the timer expires this time, and if the quantity of actually received packets exceeds a threshold, determine that the timing period is a busy state, or if the quantity of received packets is less than another threshold, determine that a state of the DP within the timing period is an idle state.

Step 303. Determine, by means of statistics collection, whether all busy/idle states within N consecutive timing periods are idle states, and if yes, control the DP to be switched from the first working mode to a second working mode, and continue to perform step 301.

When step 303 is performed, there is another case, where if busy/idle states of the DP within M consecutive timing periods are all busy states, the DP is controlled to be switched from the second working mode to the first working mode.

Figure 4:
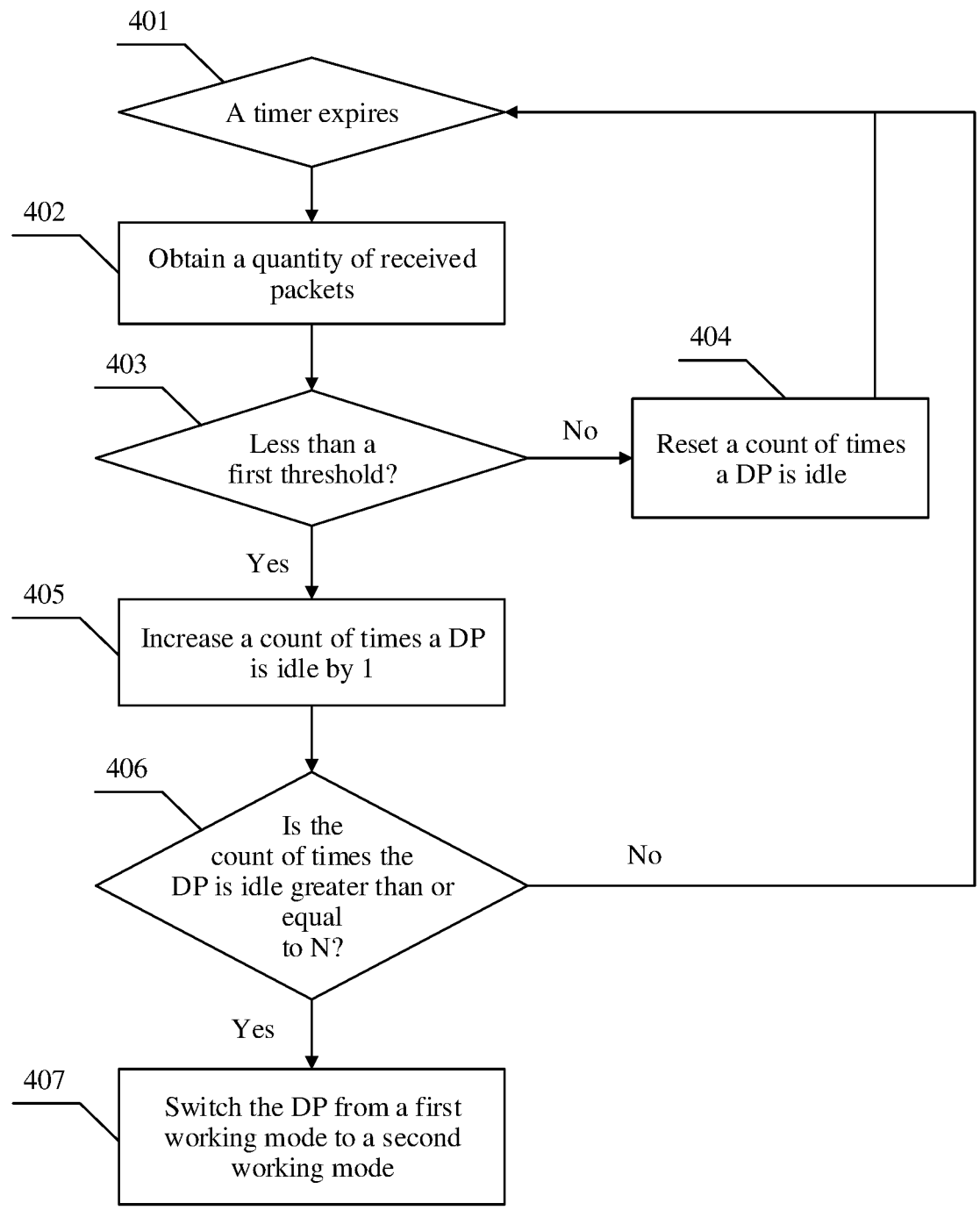
FIG. 4 is a schematic flowchart of a method according to an embodiment of the application.

Compared with the procedure shown in FIG. 3, a more underlying implementation solution is shown in FIG. 4. After an energy efficiency management function is enabled, a CP starts a timer, and then starts to perform the following steps.

Step 401. If the timer expires, restart the timer and perform step 402.

Step 402. The CP obtains, from the DP, a quantity of packets received on the DP within a timing period in which the timer expires this time.

Step 403. Determine whether the volume of actually processed data is less than a threshold, and if no, go to step 404, or if yes, go to step 405.

Step 404. Reset a count of times the DP is in an idle state, and go to step 401.

After this step is performed, the DP still stays in the first working mode.

Step 405. Increase a count of times the DP is in an idle state by 1.

Step 406. Determine whether the count of times the DP is in an idle state is greater than or equal to a threshold N, and if yes, go to step 407, or if no, go to step 401.

Step 407. The CP instructs the DP to switch from the first working mode to the second working mode.

Part 2: Because maximum data traffic that a VNIC can bear in the first working mode is fixed, a quantity of data packets that can be processed within a time is also fixed. Based on this premise, in the second working mode, there may be the following scheduling implementation solution.

First, a time window is defined. For example, one time window is 10 milliseconds (ms), and one time window is divided into multiple basic time slices. Scheduling is performed in a unit of a basic time slice. For example, each basic time slice is 500 microseconds (μs), and each basic time slice is divided into two parts, a 100 μs time for sleeping and 400 μs for attempting to perform scheduling (that is, process a data packet in the first working mode). Herein, both a time of the basic time slice and that of the time window may be randomly set, and energy saving effects are different due to different settings. Precision is better if the time of the time window and that of the basic time slice are set to be relatively long, and scheduling is more sensitive if the time of the time window and that of the basic time slice are set to be relatively short. In terms of the time of the basic time slice, an energy saving effect is better if a sleep time is set to be relatively long, and a data packet receiving speed may be faster if a time for attempting to receive a data packet in the first working mode is set to be relatively long. A specific scheduling process for data processing is as follows.

A scheduling process within a first 500 μs basic time slice is as follows.

First, the DP sleeps for 100 μs, and then attempts to receive a data packet in the first working mode. Data packets are received in batches in the first working mode. If there is no to-be-received data packet, a time for attempting to receive a data packet is 0 μs. If there is a to-be-received data packet, a larger quantity of data packets leads to a longer time. A longest time is 400 μs. Then, a next basic time slice is entered.

In the foregoing scheduling process, when a relatively small volume of data is actually processed, a quantity of data packets corresponding to 400 μs in the first working mode are not actually received, and 400 μs is not actually consumed. Therefore, when a data packet receiving requirement is relatively low, a proportion of the sleep time in the entire basic time slice is relatively high. From a perspective of the entire time window, a proportion of the sleep time is also relatively high. In this way, load of the processor can be reduced, and the sleep time decreases with a decrease in an output processing volume and changes linearly. In addition, it may be determined, in this manner, whether actual load within the basic time slice is in an idle state. For a subsequent basic time slice, how to perform scheduling within the current basic time slice may be determined according to an idle state or a busy state within a previous basic time slice, and details are as follows.

A scheduling process within a second 500 μs basic time slice and subsequent 500 μs basic time slices is as follows.

First, it is determined whether a busy/idle state of the processor within a previous basic time slice is an idle state. If the busy/idle state of the processor within the previous basic time slice is an idle state, the processor sleeps for 100 μs, and then attempts to receive a data packet in the first working mode. If the busy/idle state of the processor within the previous basic time slice is a busy state, the processor may directly attempt to receive a data packet in the first working mode, without sleeping.

If a time of each basic time slice is fixed, a busy/idle state of the processor within a basic time slice may be determined using a time consumed by the processor to process data. Details may be as follows. It is determined whether a time for attempting to receive a data packet in the first working mode reaches 400 μs or 300 μs, and the time may be set. If yes, it is determined that the busy/idle state of the processor within the basic time slice is a busy state. Otherwise, the busy/idle state of the processor within the basic time slice is an idle state. Alternatively, a busy/idle state of the processor within a basic time slice may be determined using an actual load ratio of the processor within the basic time slice. A maximum quantity of data packets received by the processor within 400 μs in the first working mode can be determined, and therefore a specified ratio is used. For example, it is determined that the busy/idle state of the processor within the basic time slice is a busy state if a quantity of actually received data packets reaches 80% of the maximum quantity, or it is determined that the busy/idle state of the processor within the basic time slice is an idle state if a quantity of actually received data packets is less than 60% of the maximum quantity. A specific reference criterion may be set. Alternatively, a relatively proper reference criterion may be determined using an actual test.

Other than the first basic time slice, a scheduling manner for the second basic time slice may be used within all subsequent basic time slices. Because the time of the basic time slice is relatively short, when load is relatively small, the sleep time is relatively long, or when load is relatively large, the sleep time is relatively short. In this case, from a macroscopic perspective, a load ratio of the processor on the DP and the volume of actually processed data are in a linear relationship such that the load ratio of the processor can be precisely controlled.

Figure 5A:
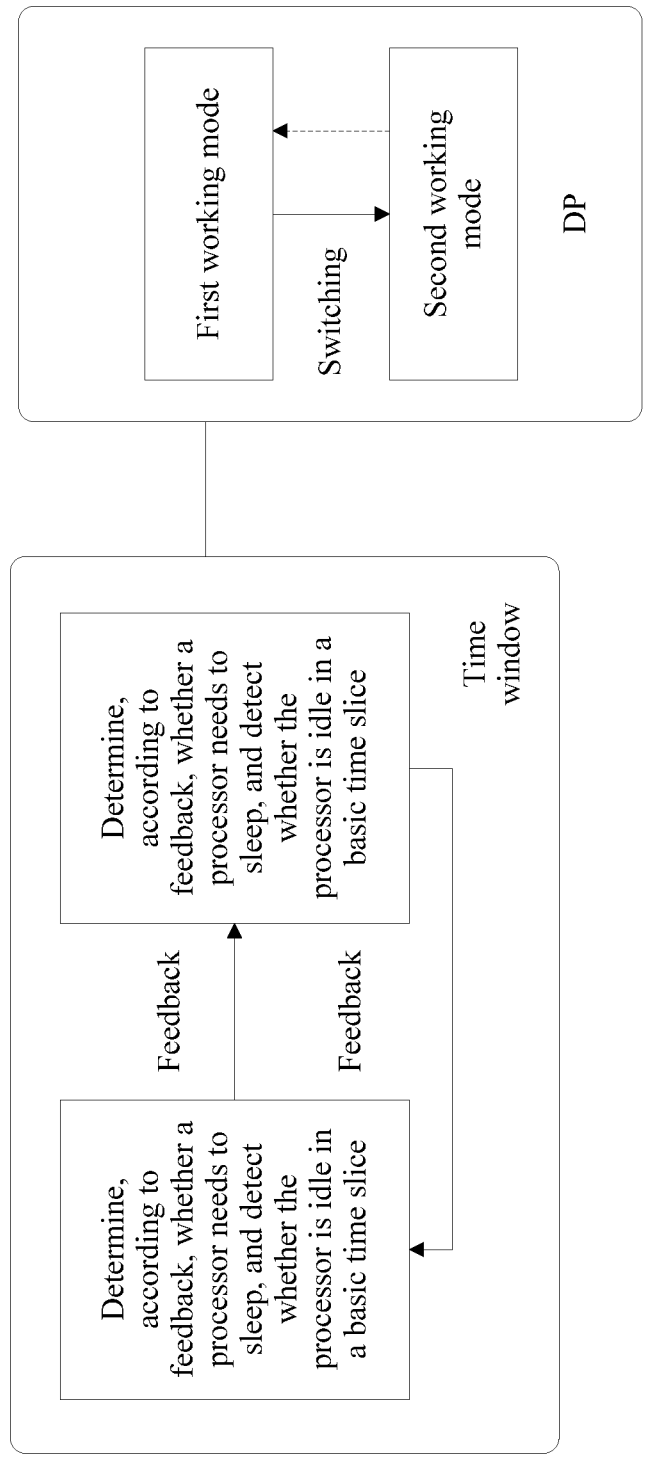
FIG. 5A is a schematic structural diagram of a system according to an embodiment of the application.

In addition, if a relatively large volume of data is actually processed by the processor within a time window, it may be determined that the processor is in a busy state within the time window. In this case, the processor may be switched from the second working mode to the first working mode on the DP. Further, as shown in FIG. 5A, a time window includes basic time slices. Within each basic time slice, "determining, according to feedback, whether the processor needs to sleep, and detecting whether the processor is in an idle state within the basic time slice" and "feedback" are performed. Feedback content is whether the processor is in an idle state within the basic time slice.

Using the solution in this embodiment, when there is a sudden change in the volume of actually processed data, scheduling is performed as far as possible without sleeping within a subsequent basic time slice of a time window. In this case, if a time window is used as an entirety to determine whether the processor is in an idle state within the entire time window, it may still be determined, within the time window, that the processor is in an idle state within the time window, and a scheduling model still stays in the second working mode. In this way, an illusion of an increase in the volume of actually processed data due to a sudden change in the volume of actually processed data can be avoided, and the processor is prevented from being immediately switched to the first working mode.

Figure 6A:
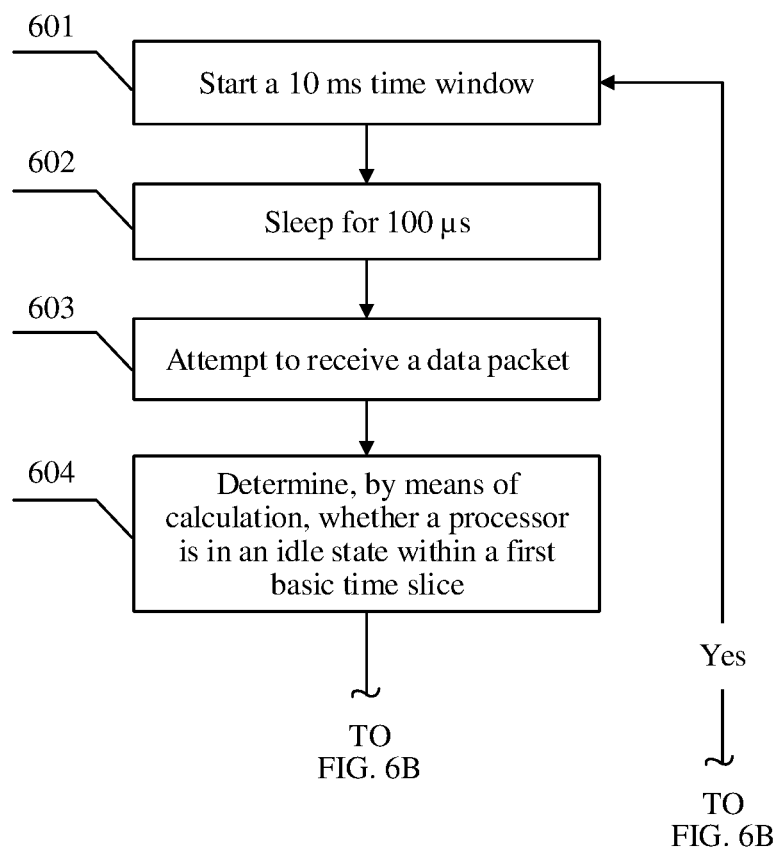
FIG. 6A and FIG. 6B are a schematic flowchart of a method according to an embodiment of the application.
Figure 6B:
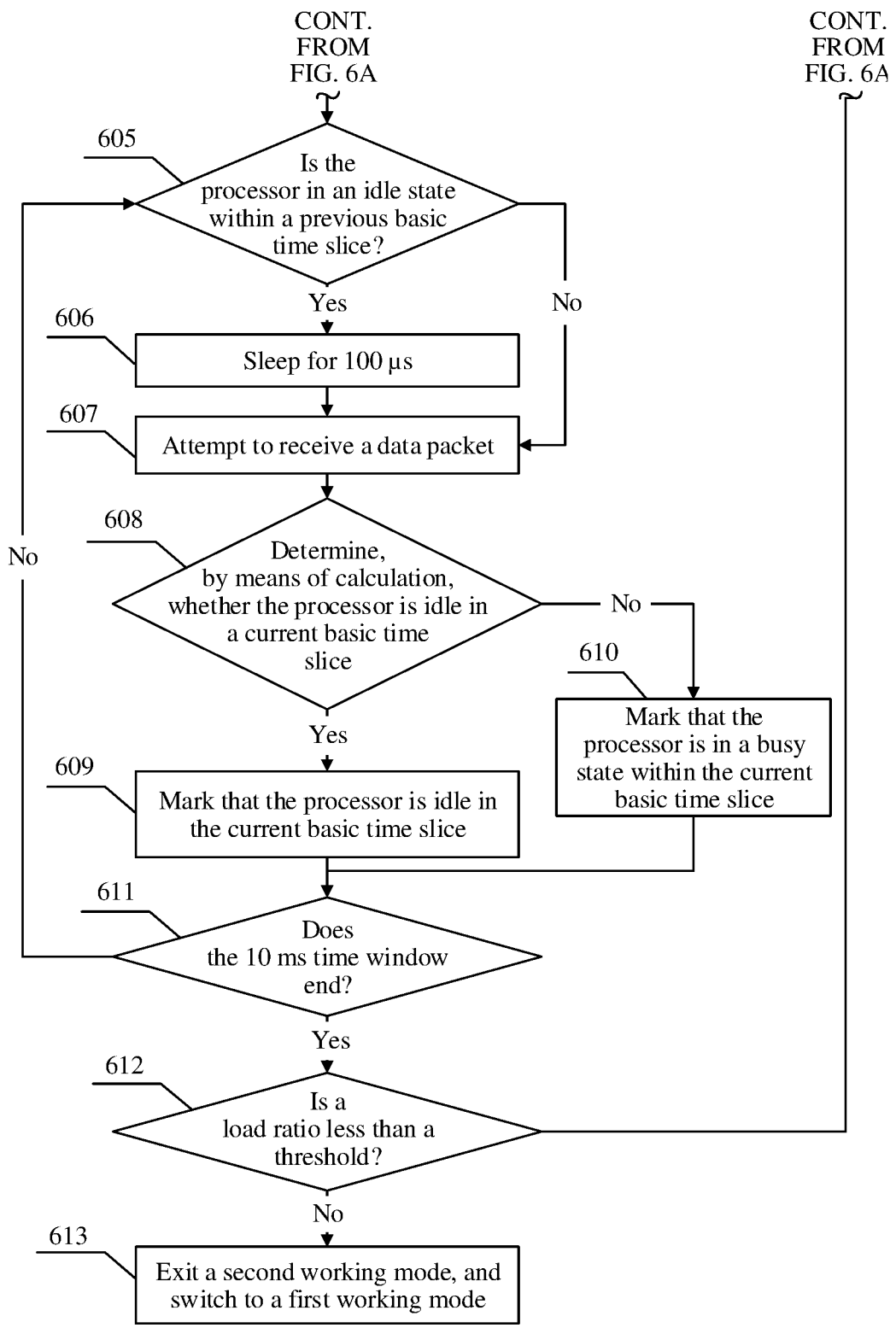

A more underlying implementation solution is shown in FIG. 6A and FIG. 6B. An energy efficiency management function is enabled. After starting a timer, the CP starts to perform the following steps.

Step 601. Start a 10 ms time window.

Step 602. Sleep for 100 μs within a first basic time slice.

Step 603. Attempt to receive a data packet in a first working mode within the first basic time slice, where N1 data packets may be received within a T1 time.

If T1 is less than 400 μs, this step ends after data packet receiving is completed. Alternatively, if T1 is equal to 400 μs, because the basic time slice runs out, T1 ends when reaching 400 μs. In this case, data packet receiving may have been completed or may not have been completed. Therefore, T1 herein should be less than or equal to 400 μs.

Step 604. Determine, by means of calculation according to a proportion of a sleep time or an actual data packet receiving time in a time of one basic time slice, whether a processor is in an idle state within the first basic time slice, and then enter a next basic time slice.

In this step, the proportion of a sleep time or an actual data packet receiving time in a time of one basic time slice is used. The proportion may also be used to indicate an actual load ratio of the processor, that is, a larger proportion of a sleep time in a time of one basic time slice indicates a lower actual load ratio.

Step 605. Determine whether the processor is in an idle state within a previous basic time slice, and if yes, go to step 606, otherwise, go to step 607.

Step 606. Sleep for 100 μs.

Step 607. Attempt to receive a data packet in the first working mode, where N2 data packets may be received within a T2 time.

If T2 is less than 400 μs, this step ends after data packet receiving is completed. Alternatively, if T2 is equal to 400 μs, because the basic time slice runs out, T2 ends when reaching 400 μs. In this case, data packet receiving may have been completed or may not have been completed. Therefore, T2 herein should be less than or equal to 400 μs.

Step 608. Determine, by means of calculation according to the proportion of a sleep time or an actual data packet receiving time in a time of one basic time slice, whether the processor is in an idle state within a current basic time slice, and if yes, go to step 609, or if no, go to step 610.

Step 609. Mark that the processor is in an idle state within the current basic time slice, and enter step 611.

Step 610. Mark that the processor is in a busy state within the current basic time slice, and enter step 611.

Step 611. Determine whether the 10 ms time window ends, and if no, go to step 605, or if yes, go to step 612.

Step 612. Determine whether a load ratio of the processor within the 10 ms time window is less than a threshold, and if yes, go to step 601, or if no, go to step 613.

Step 613. Exit a second working mode, and switch to the first working mode.

In a scheduling algorithm shown in FIG. 6A and FIG. 6B, a time window is changed to basic time slices with a smaller granularity. In this way, within some basic time slices, in addition to completing a data packet receiving function, the processor sleeps within a current basic time slice if the processor is in an idle state within a previous basic time slice. When a relatively small volume of data is actually processed, a short time is consumed to receive/send a data packet, and the processor has a relatively large quantity of opportunities to sleep within a basic time slice. When a volume of actually processed data increases, the processor has a relatively small quantity of opportunities to sleep within a basic time slice. Finally, from a perspective of a macroscopic time segment, power of the processor is substantially in direct proportion to the volume of actually processed data. In this manner, a system is scaled up/down (scale up/down). In addition, because the processor sleeps for a quite short time within each basic time slice, a relatively small delay in responding to service processing can be ensured.

Part 3: Based on the implementation in Part 2, this part provides an implementation solution for switching from the first working mode to the second working mode.

Figure 7:
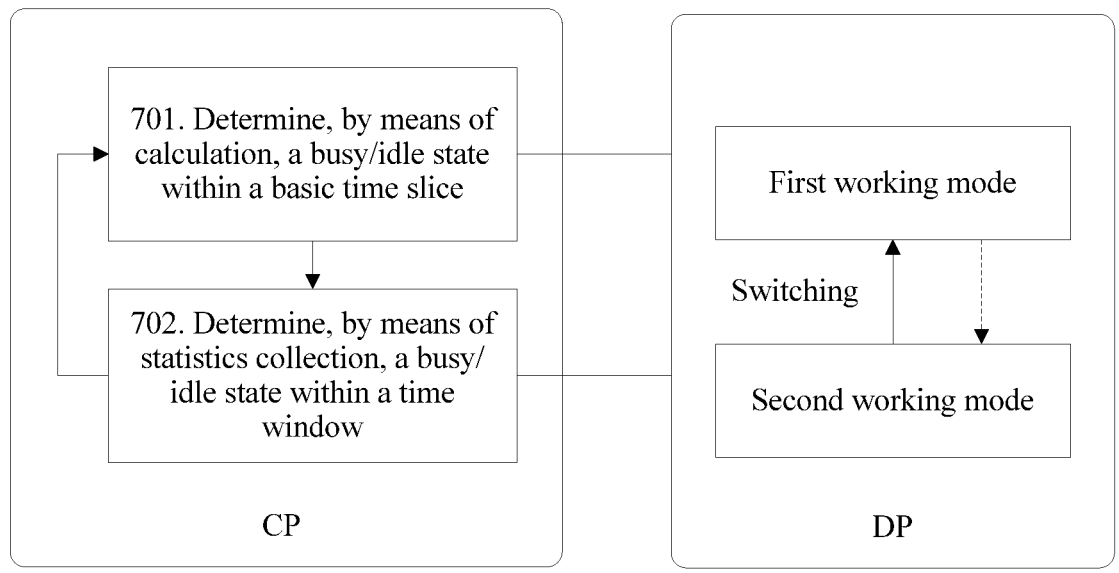
FIG. 7 is a schematic structural diagram of a system according to an embodiment of the application.

As shown in FIG. 7, on the CP, step 701 is performed within each basic time slice.

Step 701. Determine, by means of calculation, a busy/idle state of the processor within the basic time slice.

In this step, a volume of data actually processed by the processor in the second working mode within a time of the basic time slice is obtained from the DP, and then it is determined, according to the volume of actually processed data, whether the processor is in a busy state or in an idle state within the basic time slice.

After each time window ends, step 702 is performed.

Step 702. Determine, by means of statistics collection, a busy/idle state of the processor within the time window.

After a statistics result in this step is obtained, if the processor is in a busy state within the time window, the DP is controlled to be switched from the second working mode to the first working mode. It may be understood that, if the DP is currently in the first working mode, and if the processor is in an idle state within the time window, the DP is controlled to be switched from the first working mode to the second working mode.

Figure 5B:
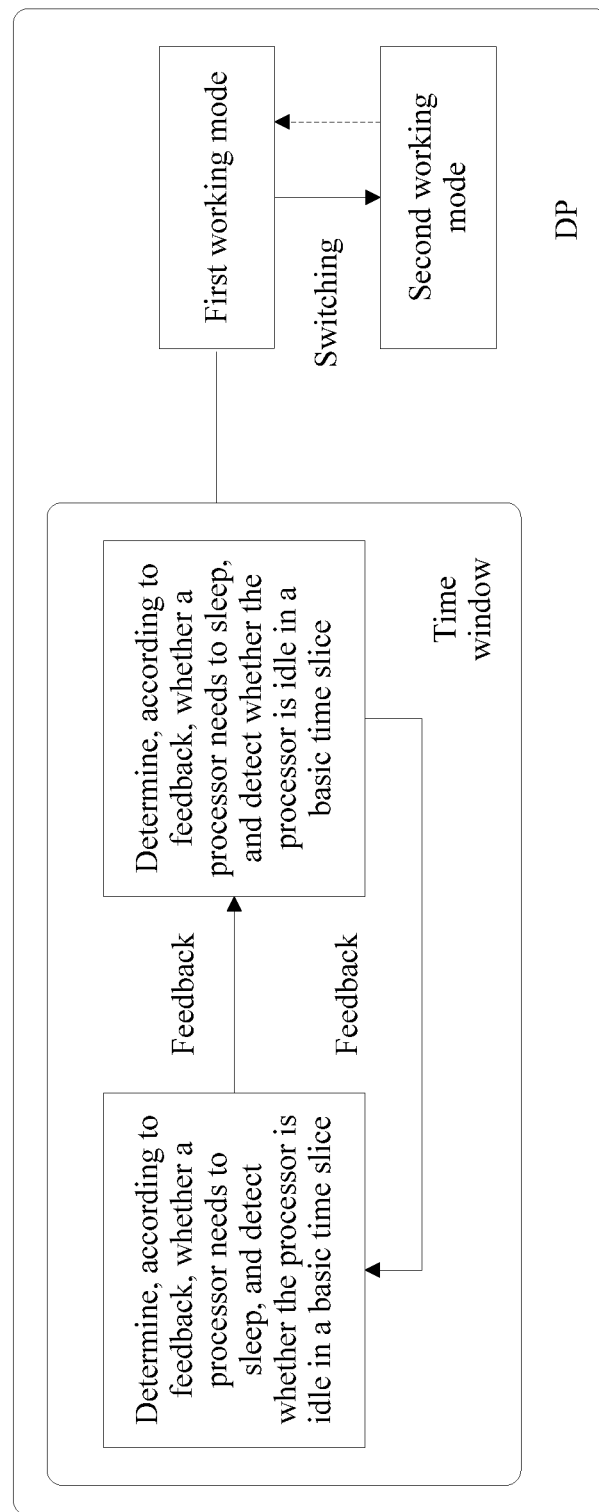
FIG. 5B is a schematic structural diagram of a system according to an embodiment of the application.

If the DP controls the processor to be switched from the second working mode back to the first working mode or from the first working mode to the second working mode, refer to FIG. 5B. Compared with FIG. 5A, a difference lies in that a time window control part is set on the DP. For descriptions of FIG. 5B, refer to the text descriptions corresponding to FIG. 5A. Details are not described herein again.

Figure 8:
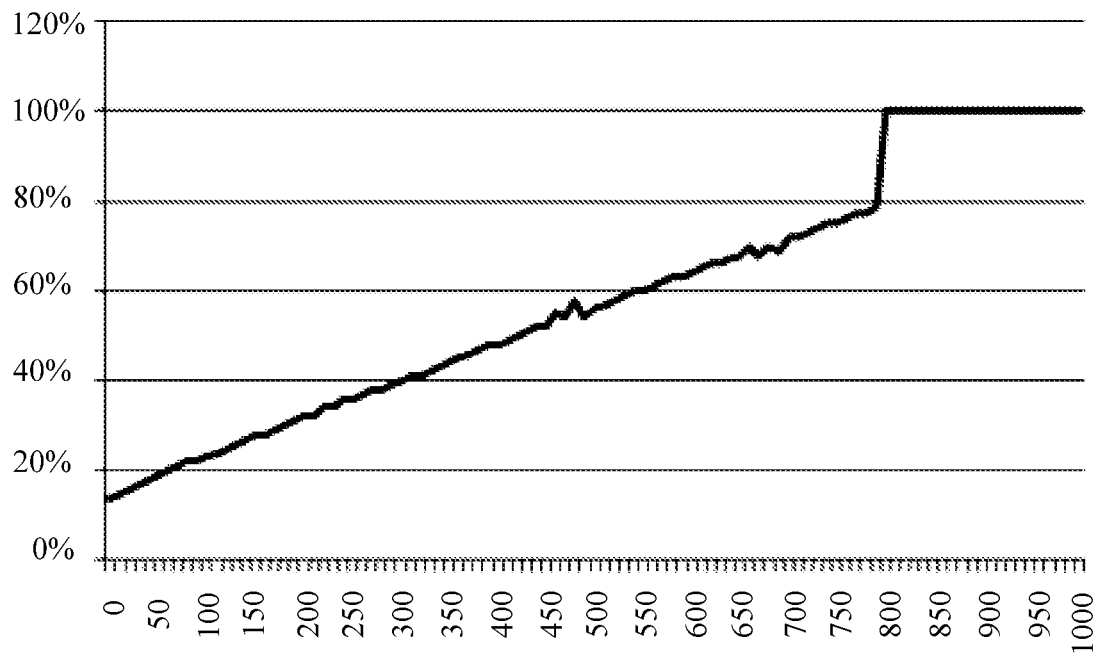
FIG. 8 is a schematic diagram of a test result according to an embodiment of the application.

After energy consumption control is performed based on a combination of the time window and the basic time slices, the volume of data actually processed by the processor is in a linear relationship with utilization of the processor on the whole. As shown in FIG. 8, FIG. 8 is a diagram of a result obtained after an actual test. An x-axis is the volume of actually processed data, and a y-axis is the utilization of the processor. The utilization of the processor corresponds to corresponding power consumption, and therefore the power consumption of the processor is also in a linear relationship with the volume of actually processed data on the whole.

Figure 9:
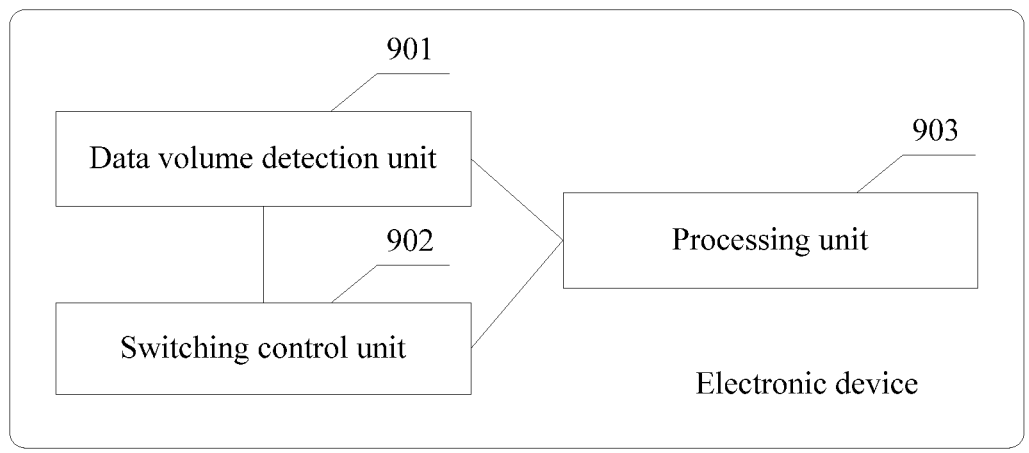
FIG. 9 is a schematic structural diagram of an electronic device according to an embodiment of the application.

An embodiment of the application further provides an electronic device. As shown in FIG. 9, the electronic device includes a data volume detection unit 901, a switching control unit 902, and a processing unit 903.

The data volume detection unit 901 is configured to monitor a volume of data processed by the electronic device within a first monitoring time segment.

The switching control unit 902 is configured to switch the processing unit 903 from the first working mode to a second working mode if it is determined, according to the volume of data processed by the electronic device within the first monitoring time segment, that the processing unit 903 is idle within the first monitoring time segment.

The processing unit 903 is configured to process, by the processing unit 903, data in a PMD manner in the first working mode when the processing unit 903 is configured to be in the first working mode, and process, by the processing unit 903, data in the PMD manner and a sleep manner in the second working mode.

For the electronic device that works in the PMD manner, the two working modes are provided for the processing unit 903 of the electronic device. Power consumption is relatively high in the first working mode, and power consumption is relatively low in the second working mode. The volume of data processed by the processing unit 903 is monitored such that when a relatively small volume of data is actually processed, energy consumption can be reduced using a working mode with relatively low energy consumption.

In the embodiment of the electronic device, for technical terms and corresponding descriptions, refer to the detailed descriptions in the method embodiment, and details are not described one by one herein again.

Optionally, the processing unit 903 is further configured to use the second working mode within a first basic time slice in the second working mode. The first basic time slice includes a first time segment and a second time segment. The processing unit 903 sleeps within the first time segment, and works within the second time segment.

Figure 10:
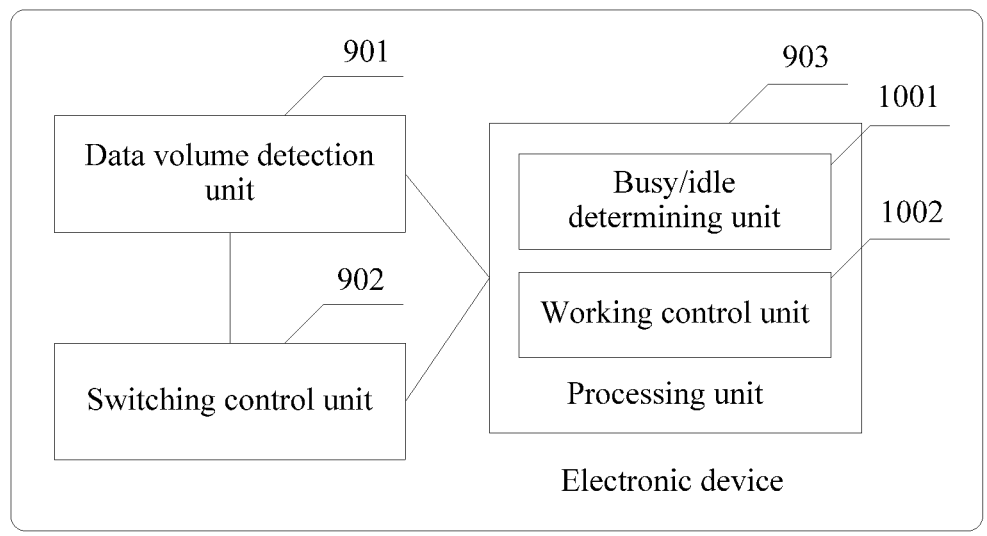
FIG. 10 is a schematic structural diagram of an electronic device according to an embodiment of the application.

As shown in FIG. 10, the processing unit 903 further includes a busy/idle determining unit 1001 configured to determine a busy/idle state of the processing unit 903 within the first basic time slice after the first basic time slice ends, and a working control unit 1002 configured to control the processing unit 903 to work within a first time segment of a second basic time slice when the busy/idle determining unit 1001 determines that the busy/idle state of the processing unit 903 within the first basic time slice is a busy state.

Optionally, if the processing unit 903 completes data processing before the second time segment of the first basic time slice ends, the processing unit 903 is further configured to end the second time segment of the first basic time slice in advance, or sleep in a remaining time of the second time segment.

Optionally, the busy/idle determining unit 1001 is further configured to determine, by the electronic device, that the busy/idle state within the first basic time slice is a busy state if a time in which the processing unit 903 processes data within the first basic time slice is greater than a first threshold, determine, by the electronic device, that the busy/idle state within the first basic time slice is a busy state if the processing unit 903 is in a data processing state when the second time segment of the first basic time slice ends, or determine, by the electronic device, that the busy/idle state within the first basic time slice is a busy state if a volume of data processed by the processing unit 903 within the first basic time slice is greater than a second threshold.

Optionally, the busy/idle determining unit 1001 is further configured to determine that the busy/idle state within the first basic time slice is an idle state if a time in which the processing unit 903 processes data within the first basic time slice is less than the third threshold, where the third threshold is less than or equal to the first threshold, determine that the busy/idle state within the first basic time slice is an idle state if the processing unit 903 is in a sleep state when the second time segment of the first basic time slice ends, or if the processing unit 903 ends the second time segment of the first basic time slice in advance, or determine that the busy/idle state within the first basic time slice is an idle state if a volume of data processed by the processing unit 903 within the first basic time slice is less than a fourth threshold, where the fourth threshold is less than or equal to the second threshold.

The data volume detection unit 901 is further configured to monitor a volume of data processed by the electronic device within a second monitoring time segment when the processing unit 903 is in the second working mode.

The switching control unit 902 is further configured to switch the processing unit 903 from the second working mode to the first working mode if it is determined, according to the volume of data processed by the electronic device within the second monitoring time segment, that the processing unit 903 is busy within the second monitoring time segment.

Data traffic is still used as an example. The data traffic is used as a criterion for measuring whether the processing unit 903 is idle. This embodiment may be further include that the switching control unit 902 is further configured to switch the processing unit 903 from the second working mode to the first working mode if it is determined, by means of monitoring, that data traffic of the electronic device within the second monitoring time segment is greater than or equal to the second threshold, where the first threshold is greater than or equal to the second threshold.

Figure 11:
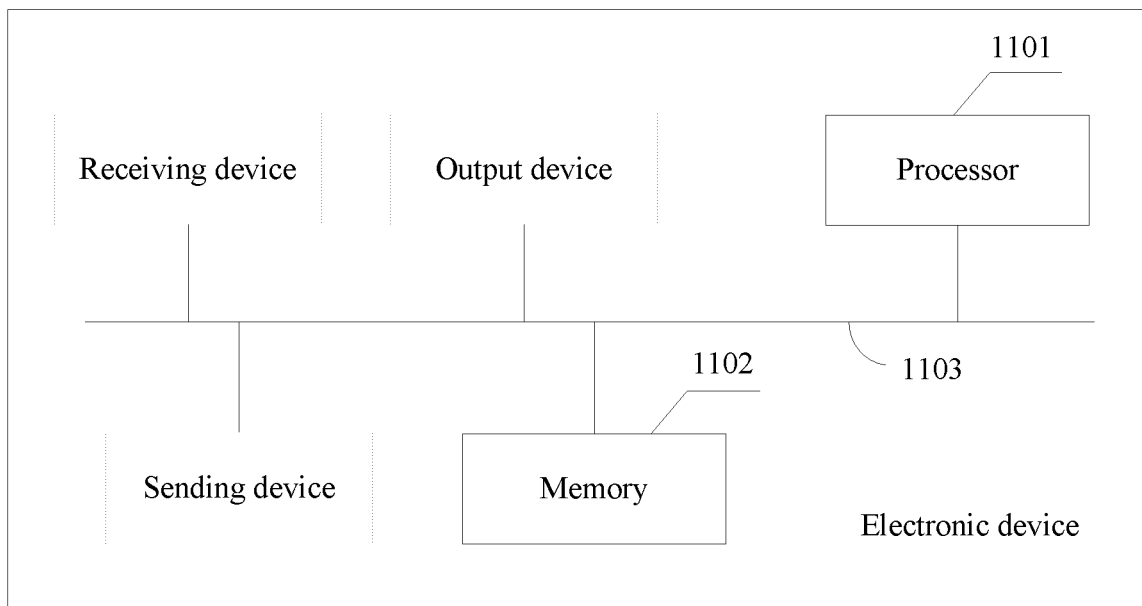
FIG. 11 is a schematic structural diagram of an electronic device according to an embodiment of the application.

An embodiment of the application further provides another electronic device. As shown in FIG. 11, the electronic device includes a processor 1101 and a memory 1102. The electronic device may further include a receiving device, a sending device, an output device, and the like. The processor 1101 and the memory 1102 may be connected using a bus 1103, or may be connected using another hardware interface.

The processor 1101 has the following functions of monitoring a volume of data processed by the electronic device within a first monitoring time segment, where the processor 1101 of the electronic device is configured to be in a first working mode, and the processor 1101 processes data in a PMD manner in the first working mode, and switching the processor 1101 from the first working mode to a second working mode if it is determined, according to the volume of data processed by the electronic device within the first monitoring time segment, that the processor is idle within the first monitoring time segment, where the processor 1101 processes data in the PMD manner and a sleep manner in the second working mode.

Compared with the first working mode, a sleep time is added in the second working mode. Therefore, power consumption is relatively low, and correspondingly a data packet receiving capability is relatively low. There is a relatively large quantity of manners of determining, using a volume of data processed by the processor within a time segment, whether the processor is idle within the time segment. Data packet receiving and/or sending is used as an example. The manner may be if it is determined, by means of monitoring, that data traffic of the electronic device within the first monitoring time segment is less than or equal to a first threshold, it is determined that the processor is idle within the first monitoring time segment, where the first threshold is a threshold corresponding to the data traffic that is a volume of data received in a unit time. Alternatively, the manner may be if it is determined, by means of monitoring, that the volume of data processed by the electronic device within the first monitoring time segment is less than or equal to a first threshold, it is determined that the processor is idle within the first monitoring time segment, where the first threshold is a threshold corresponding to the volume of data processed within the first monitoring time segment. The first threshold is a threshold used to determine whether the processor is relatively idle. When the processor is relatively idle, the processor is switched to a working mode with relatively low energy consumption.

In an optional implementation, the processor 1101 uses the second working mode within a first basic time slice, and that the processor 1101 processes data in the PMD manner and a sleep manner in the second working mode includes that the first basic time slice includes a first time segment and a second time segment, and the processor 1101 sleeps within the first time segment, and works within the second time segment.

In this embodiment, the first basic time slice and a second basic time slice in a subsequent embodiment are obtained after basic time slices are classified. The first basic time slice may be a first basic time slice that exists after the processor 1101 is switched from the first working mode to the second working mode. Alternatively, in the second working mode, the processor 1101 works, by default in each basic time slice, in a working mode within the first basic time slice. The second working mode may be a representative of another basic time slice other than the first basic time slice. In this case, the first basic time slice may be considered as a previous basic time slice of the second basic time slice. Duration of a basic time slice may be randomly set, and usually may be set to be relatively short. The first time segment and the second time segment may be correspondingly relatively short. In this way, scheduling precision can be improved. In addition, the processor 1101 sleeps for a relatively short time each time such that a response speed of the processor 1101 can be improved.

In an optional implementation, a specific implementation solution for increasing working mode control flexibility is further provided. The solution is as follows. The processor 1101 has the following functions of determining, by the processor 1101, a busy/idle state of the processor 1101 within the first basic time slice after the first basic time slice ends, and when the busy/idle state of the processor 1101 within the first basic time slice is a busy state, working, by the processor 1101, within a first time segment of a second basic time slice.

In this embodiment, whether the processor 1101 works within the first time segment depends on a current busy/idle state of the processor 1101. A data processing capability of the processor 1101 may be dynamically adjusted on the premise that a working mode of the processor 1101 is not switched such that the data processing capability of the processor 1101 can match an actual requirement to improve a speed of responding to a data processing requirement, energy consumption is in a linear positive correlation with an actual data processing requirement, and working mode switching of the processor 1101 due to a sudden change in an instantaneous data processing requirement can be avoided.

In an optional implementation, that the processor 1101 works within the second time segment includes if the processor 1101 completes data processing before the second time segment of the first basic time slice ends, ending, by the processor 1101, the second time segment of the first basic time slice in advance, or sleeping in a remaining time of the second time segment.

In this embodiment, the processor 1101 may not always need to process data within the second time segment, and therefore no data may need to be processed by the processor 1101 for a relatively long time within the second time segment. By means of this embodiment, the sleep time may be further increased based on an actual data processing requirement to further reduce power consumption of the processor 1101.

In an optional implementation, the determining, by the processor 1101, a busy/idle state of the processor 1101 within the first basic time slice includes determining, by the electronic device, that the busy/idle state within the first basic time slice is a busy state if a time in which the processor 1101 processes data within the first basic time slice is greater than a first threshold, determining, by the electronic device, that the busy/idle state within the first basic time slice is a busy state if the processor 1101 is in a data processing state when the second time segment of the first basic time slice ends, or determining, by the electronic device, that the busy/idle state within the first basic time slice is a busy state if a volume of data processed by the processor 1101 within the first basic time slice is greater than a second threshold.

In this embodiment, both the first threshold and the second threshold are thresholds used to determine whether the processor 1101 is busy within the first basic time slice. A time consumed to process data is used as a reference for the first threshold, and a longer time consumed to process data indicates that the processor 1101 is busier. A volume of data is used as a reference for the second threshold, and a larger volume of data indicates that the processor 1101 is busier. A value that is used is not uniquely limited in this embodiment of the application.

In an optional implementation, that the processor 1101 is further configured to determine the busy/idle state is as follows. If a time in which the processor 1101 processes data within the first basic time slice is less than a third threshold, determining, by the electronic device, that the busy/idle state within the first basic time slice is an idle state, where the third threshold is less than or equal to the first threshold, if the processor 1101 is in a sleep state when the second time segment of the first basic time slice ends, or if the processor 1101 ends the second time segment of the first basic time slice in advance, determining, by the electronic device, that the busy/idle state within the first basic time slice is an idle state, or if a volume of data processed by the processor 1101 within the first basic time slice is less than a fourth threshold, determining, by the electronic device, that the busy/idle state within the first basic time slice is an idle state, where the fourth threshold is less than or equal to the second threshold.

In this embodiment, both the third threshold and the fourth threshold are thresholds used to determine whether the processor 1101 is busy within the first basic time slice. A time consumed to process data is used as a reference for the third threshold, and a longer time consumed to process data indicates that the processor 1101 is busier. A volume of data is used as a reference for the fourth threshold, and a larger volume of data indicates that the processor 1101 is busier. A value that is used is not uniquely limited in this embodiment of the application.

In an optional implementation, the processor 1101 is further configured to monitor a volume of data processed by the electronic device within a second monitoring time segment when the processor 1101 is in the second working mode, and switch the processor from the second working mode to the first working mode if it is determined, according to the volume of data processed by the electronic device within the second monitoring time segment, that the processor is busy within the second monitoring time segment. The first threshold is greater than or equal to the second threshold.

Data traffic is still used as an example. The data traffic is used as a criterion for measuring whether the processor is idle. This embodiment may include that when the processor 1101 is in the second working mode, data traffic of the electronic device within the second monitoring time segment is monitored, and the processor 1101 is switched from the second working mode to the first working mode if it is determined, by means of monitoring, that the data traffic of the electronic device within the second monitoring time segment is greater than or equal to the second threshold, where the first threshold is greater than or equal to the second threshold.

In this embodiment, when the second threshold is used to determine that the processor 1101 is relatively busy or a relatively large quantity of data packets currently need to be processed, an application scenario in which the processor exerts a maximum data processing capability of the processor to a greatest extent is needed. That the second threshold is greater than the first threshold may be used as a preferred implementation solution. When a volume of actually processed data is between the first threshold and the second threshold, a current working mode may be maintained such that when actual data traffic changes around the first threshold and the second threshold, the processor 1101 is prevented from being frequently switched between the first working mode and the second working mode.

Optionally, the electronic device is a virtual device. If the electronic device is a virtual device, a hardware entity to which the electronic device in this embodiment of the application is applied may be corresponding to the physical host shown in FIG. 1, and the electronic device corresponds to the VM. The processor may be a processor of the physical host, or may be a data processing resource allocated by the physical host to the VM.

It should be noted that, the apparatus division is merely logical function division, but is not limited to the foregoing division provided that corresponding functions can be implemented. In addition, specific names of the functional units are merely provided for the purpose of distinguishing the units from one another, but are not intended to limit the protection scope of the application.

In addition, a person of ordinary skill in the art may understand that all or some of the steps of the method embodiments may be implemented by a program instructing relevant hardware. The corresponding program may be stored in a computer readable storage medium. The mentioned storage medium may be a read-only memory, a magnetic disk, an optical disc, or the like.

The foregoing descriptions are merely examples of specific implementations of the application, but are not intended to limit the protection scope of the application. Any variation or replacement readily figured out by a person skilled in the art within the technical scope disclosed in the embodiments of the application shall fall within the protection scope of the application. Therefore, the protection scope of the application shall be subject to the protection scope of the claims.

What is claimed is:

1. A scheduling method implemented by a processor of an electronic device and comprising:
    monitoring a first volume of first data processed by the electronic device within a first monitoring time segment;
    operating in a first working mode;
    processing the first data in a poll mode driver (PMD) manner while operating in the first working mode;
    switching from the first working mode to a second working mode according to the first volume and when the processor is idle within the first monitoring time segment;
    processing second data, in the PMD manner and a sleep manner while operating in the second working mode within a first basic time slice, by:
        sleeping within a first time segment of the first basic time nice, and
        working within a second time segment of the first basic time slice
    determining that a state of the processor within the first basic time slice comprises a busy state when a time in which the processor processes the second data within the first basic time slice is greater than a first threshold, in response to the processor being in a data processing state when the second time segment ends, or when a second volume of the second data processed by the electronic device within the first basic time slice is greater than a second threshold; and
    working, after the first basic time slice ends, within a third time segment of a second basic time slice in response to the state within the first basic time slice comprising the busy state.

2. The scheduling method of claim 1, wherein when the processor completes data processing before the second time segment of the first basic time slice ends, working within the second time segment comprises ending the second time segment in advance.

3. The scheduling method of claim 1, further comprising:
    monitoring a second volume of the second data processed by the electronic device within a second monitoring time segment when the processor is in the second working mode; and
    switching from the second working mode to the first working mode according to the second volume and when the processor is busy within the second monitoring time segment.

4. The method of claim 1, wherein when the processor completes data processing before the second time segment of the first basic time slice ends, working within the second time segment comprises sleeping in a remaining time of the second time segment.

5. The method of claim 1, wherein the state of the processor within the first basic time slice comprises the busy state.

6. The method of claim 1, wherein the state of the processor within the first basic time slice comprises an idle state.

7. The scheduling method of claim 1, wherein processing the first data in the PMD manner comprises using a PMD loop to receive the first data.

8. An electronic device comprising:
    a non-transitory memory configured to store instructions; and
    a processor coupled to the non-transitory memory and configured to execute the instructions to:
        monitor a first volume of first data processed by the electronic device within a first monitoring time segment;
        operate in a first working mode;
        process the first data in a poll mode driver (PMD) manner while operating in the first working mode;
        switch from the first working mode to a second working mode according to the first volume and when the processor is idle within the first monitoring time segment;

process second data, in the PMD manner and a sleep manner while operating in the second working mode within a first basic time slice, by:
  sleeping, within a first time segment of the first basic time slice, and
  working within a second time segment of the first basic time slice;
determine that a state of the processor within the first basic time slice comprises a busy state when a time in which the processor processes the second data within the first basic time slice is greater than a first threshold, in response to the processor being in a data processing state when the second time segment ends, or when a second volume of the second data processed by the electronic device within the first basic time slice is greater than a second threshold; and
work, after the first basic time slice ends, within a third time segment of a second basic time slice in response to the state within the first basic time slice comprising the busy state.

9. The electronic device of claim 8, wherein when the processor completes data processing before the second time segment of the first basic time slice ends, the processor is further configured to end the second time segment in advance.

10. The electronic device of claim 8, wherein the processor is further configured to:
monitor a second volume of second data processed by the electronic device within a second monitoring time segment when the processor is in the second working mode; and
switch from the second working mode to the first working mode according to the second volume and when the processor is busy within the second monitoring time segment.

11. The electronic device of claim 8, wherein when the processor completes data processing before the second time segment of the first basic time slice ends, the processor is further configured to sleep in a remaining time of the second time segment.

12. The electronic device of claim 7, wherein the state of the processor within the first basic time slice comprises the busy state.

13. The electronic device of claim 8, wherein the state of the processor within the first basic time slice comprises an idle state.

14. A computer program product comprising instructions for storage on a non-transitory medium and that, when executed by a processor, cause an electronic device to:
monitor a first volume of first data processed by the electronic device within a first monitoring time segment;
operate in a first working mode;
process the first data in a poll mode driver (PMD) manner while operating in the first working mode;
switch from the first working mode to a second working mode according to the first volume and when the processor is idle within the first monitoring time time segment;
process second data, in the PMD manner and a sleep manner while operating in the second working mode within a first basic time slice, by;
  sleeping within a first time segment of the first basic time slice, and
  working within a second time segment of the first basic time slice,
determine that a state of the processor within the first basic time slice comprises a busy state when a time in which the processor processes the second data within the first basic time slice is greater than a first threshold, in response to the processor being in a data processing state when the second time segment ends, or When a second volume of the second data processed by the electronic device within the first basic time slice is greater than a second threshold; and
work, after the first basic time slice ends, within a third time segment of a second basic time slice in response to the state within the first basic time slice comprising the busy state.

15. The computer program product of claim 14, wherein when the processor completes data processing before the second time segment of the first basic time slice ends, the instructions further cause the electronic device to end the second time segment in advance.

16. The computer program product of claim 14, wherein the instructions further cause the electronic device to:
monitor a second volume of second data processed by the electronic device within a second monitoring time segment when the processor is in the second working mode; and
switch from the second working mode to the first working mode according to the second volume and when the processor is busy within the second monitoring time segment.

17. The computer program product of claim 14, wherein when the processor completes data processing before the second time segment of the first basic time slice ends, the instructions further cause the electronic device to sleep in a remaining time of the second time segment.

18. The computer program product of claim 14, wherein the state of the processor within the first basic time slice comprises the busy state.

19. The computer program product of claim 14, wherein the state of the processor within the first basic time slice comprises an idle state.

20. The computer program product of claim 14, wherein the instructions further cause the electronic device to further process the first data in the PMD manner using a PMD loop to receive the first data.

* * * * *

UNITED STATES PATENT AND TRADEMARK OFFICE
CERTIFICATE OF CORRECTION

PATENT NO. : 10,929,179 B2  
APPLICATION NO. : 16/139817  
DATED : February 23, 2021  
INVENTOR(S) : Jiachun Guo and Qingqing Li Page 1 of 1

It is certified that error appears in the above-identified patent and that said Letters Patent is hereby corrected as shown below:

In the Claims

Claim 12, Column 25, Line 41: "The electronic device of claim 7" should read "The electronic device of claim 8"

Claim 14, Column 26, Line 3: "processor is idle within the first monitoring time time" should read "processor is idle within the first monitoring time"

Claim 14, Column 26, Line 17: "state when the second time segments ends, or When a" should read "state when the second time segment ends, or when a"

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*